(12) United States Patent
Svensson

(10) Patent No.: US 7,404,316 B2
(45) Date of Patent: Jul. 29, 2008

(54) METHOD FOR ESTIMATING A MEASURE OF THE FRICTION COEFFICIENT BETWEEN THE STATOR AND THE ROTOR IN A BRAKING DEVICE

(75) Inventor: Jan-Inge Svensson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/422,077

(22) Filed: Jun. 3, 2006

(65) Prior Publication Data
US 2006/0220449 A1    Oct. 5, 2006

Related U.S. Application Data

(63) Continuation of application No. PCT/SE2004/001823, filed on Dec. 6, 2004.

(30) Foreign Application Priority Data
Dec. 4, 2003    (SE) .................................. 0303275

(51) Int. Cl.
*G01L 5/28* (2006.01)
(52) U.S. Cl. ...................................... 73/121
(58) Field of Classification Search .................. 73/121
See application file for complete search history.

(56) References Cited

U.S. PATENT DOCUMENTS

| | | | |
|---|---|---|---|
| 4,591,213 A | 5/1986 | Rapoport | |
| 5,515,949 A | 5/1996 | Baumgartner et al. | |
| 5,596,513 A | 1/1997 | Schricker | |
| 5,622,240 A | 4/1997 | Hartl | |
| 6,508,522 B1 | 1/2003 | Li et al. | |
| 2002/0138189 A1 | 9/2002 | Kubik | |

FOREIGN PATENT DOCUMENTS

| | | |
|---|---|---|
| EP | 0 621 829 B1 | 4/1997 |
| EP | 1 083 360 A2 | 3/2001 |
| EP | 1 359 078 A1 | 11/2003 |
| GB | 2 382 390 A | 5/2003 |
| JP | 05092760 A * | 4/1993 |
| JP | 2001039280 A * | 2/2001 |
| JP | 2005319913 A * | 11/2005 |
| JP | 2006307994 A * | 11/2006 |

OTHER PUBLICATIONS

International Search Report mailed Mar. 9, 2005 with Publication WO 2005/058665 dated Jun. 30 2005.

* cited by examiner

*Primary Examiner*—Edward Lefkowitz
*Assistant Examiner*—Jermaine Jenkins
(74) *Attorney, Agent, or Firm*—Novak Druce + Quigg LLP

(57) ABSTRACT

A method for estimating the friction coefficient between the stator and the rotor in a braking device including the following method steps: measurement of the temperature of the braking device, establishment of the friction coefficient by calculating the relationship between a measure of thermal energy generated by the rotor and the stator during a time interval and a measure of braking energy absorbed by the rotor and the stator during the same time interval, in which the generated thermal energy is calculated from a function of the measured temperature. The method is preferably used in calculating a correction factor for trailer compensation.

17 Claims, 3 Drawing Sheets

METHOD FOR ESTIMATING A MEASURE OF THE FRICTION COEFFICIENT BETWEEN THE STATOR AND THE ROTOR IN A BRAKING DEVICE

CROSS-REFERENCE TO RELATED APPLICATIONS

The present application is a continuation patent application of International Application No. PCT/SE2004/001823 filed 6 Dec. 2004 which is published in English pursuant to Article 21(2) of the Patent Cooperation Treaty and which claims priority to Swedish Application No. 0303275-2 filed 4 Dec. 2003. Said applications are expressly incorporated herein by reference in their entireties.

TECHNICAL FIELD

The present invention relates to a method for estimating a measure of the friction coefficient between the stator and the rotor in a braking device of a motor vehicle.

BACKGROUND OF THE INVENTION

In order to provide a vehicle offering good handling characteristics, it is important that the braking system belonging to the vehicle works satisfactorily. Included in this is that, when the brakes are applied, braking devices integral to the vehicle must distribute the braking force in proportion to the axle load. Uneven distribution of braking force can lead, firstly, to increased wear and, secondly, to the vehicle skidding or becoming unstable should the braking force distribution be very uneven. Where a trailer is coupled to the vehicle with a draw bar, furthermore, the braking force should be distributed between tow car and trailer so that the braking devices of the tow car brakes the mass of the tow car and the braking devices of the trailer brakes the mass of the trailer. For a tow car with semitrailer, some of the weight of the semitrailer will end up on the axles of the tractor. In this case, the tractor brakes some of the mass of the semitrailer.

Despite the general desire to distribute the braking force evenly between the braking devices of the vehicle, it may in certain cases be desirable to distribute the braking force differently between different axles of the vehicle. An example of such occasions is when the service brakes need reconditioning and the reconditioning is carried out by virtue of the fact that braking in which the absorbed quantity of energy at the service brake shall exceed a certain limit value. Such a system is described in Swedish patent application SE 0101253-3, the disclosure of which is hereby expressly incorporated by reference in its entirety.

Both in systems in which the braking force is to be distributed evenly between the braking devices of the vehicle and in cases in which uneven distribution is realized with a view to reconditioning the service brakes, it is important for an estimate to be made of applied braking force for braking devices integral to the vehicle.

A system for monitoring the distribution of braking force between different brakes in a vehicle is described in U.S. Published patent application Ser. No. 2002/0138189, the disclosure of which is hereby expressly incorporated by reference in its entirety. The system described in this patent application comprises a temperature sensor which measures the temperature of the surroundings of the brake. In the braking operation, the brakes are heated by the energy absorbed by the brake when braking. The temperature which is measured by the sensor is a function of the absorbed braking energy. By monitoring the temperature of the brakes, the braking force for the brakes integral to the vehicle can be monitored. The system described in said patent application measures the temperature and controls the brakes with a view to obtaining as even a temperature as possible for the brakes. This means that the system does not provide information on applied braking force at each of the brakes.

Should the vehicle comprise a number of axles bearing different loads and where the principle is adopted that each of the axles shall brake its own weight, brakes associated with different axles will absorb different amounts of braking energy. This means that the brakes will be heated to different degrees, in which case the system according to U.S. 2002/0138189 will cause a fault signal to be generated and the intended braking force to be redistributed.

Furthermore, the system according to U.S. 2002/0138189 will not be capable of enabling a redistribution between the applied braking force of a trailer coupled to the vehicle, in which the brakes are not monitored according to the system, and the vehicle's own brakes, since the system according to U.S. 2002/01 38189 ensures only that the brakes of the vehicle acquire substantially the same temperature. Should the brakes of the trailer absorb more than the weight of the trailer, the brakes of the tow car will get too cold, and should the brakes of the trailer absorb less than the weight of the trailer, the brakes of the tow car will get too hot. The correction of braking force distribution between trailer and tow car is commonly referred to as trailer adjustment.

The system described in 2002/0138189 is not configured to allow correct distribution of the braking force between the brakes of an unmonitored trailer and the brakes of a tow car.

In known systems, trailer adjustment is realized under the assumption that the friction coefficient of the brake device of the vehicle is constituted by a known constant. The friction coefficient varies between different braking devices, inter alia in dependence on how the brake has previously been used and in what environment the brake has been located in. This variation can be explained by the fact that so-called glazing can take place or by the presence of dirt and rust on the brake. Both glazing and dirt and rust deposits have a major effect on the friction coefficient of the brake.

SUMMARY OF THE INVENTION

An object of the invention is to provide means which allow a correct distribution of the braking force between a trailer and tow car and/or a correct distribution of the braking force between two differently loaded axles to be obtained.

In one embodiment, the invention takes the form of a method used to estimate a measure of the friction coefficient between the stator and the rotor in a braking device. By a measure of the friction coefficient it is meant the friction coefficient or any parameter or variable which is proportional to the friction coefficient, such as brake factor, braking force or braking moment.

Once the friction coefficient is estimated, the braking moment and/or the braking force can be calculated. In order to calculate the braking moment and/or the braking force, knowledge is needed of the force with which the stator is applied to the rotor when braking. The braking force can be calculated by multiplying the friction coefficient by the application force.

Once the friction coefficient or, where appropriate, a brake factor constituting a linear scaling of the friction coefficient, in which this has been multiplied by a radius corresponding to the distance from the center of rotation of the rotor to the point of application of the braking force has been established, the particular braking moment and/or the particular braking force can be calculated for each brake integral to the braking system of the vehicle. The brake factor is a representation between brake pressure and brake moment and is applied since the pressure is easiest to measure in a pneumatic braking system.

According to the invention, the friction coefficient and/or, where appropriate, the brake factor is estimated by the fact that a calculation of the relationship between a measure of thermal energy generated by the rotor and the stator during a time interval and a measure of braking energy absorbed by the rotor and the stator during the same time interval, in which said generated thermal energy is calculated from a function of said measured temperature.

The friction coefficient or the brake factor can therefore be determined through knowledge of the temperature of the braking device or the immediate surroundings of the braking device, and knowledge of a measure of the braking energy absorbed by the stator and the rotor.

The thermal energy which is generated by the stator and the rotor during a braking operation can be described as follows:

1) $E = k \int T dt$, where k is a constant and T is constituted by the measured temperature. The integration is realized during the measuring time interval. The constant k can be determined empirically and is dependent on the placement of the temperature probe and on the design of the brake.

The braking energy which is absorbed by the braking device in the braking operation can be described as follows:

2) $E = \int F_B v dt = \int M_B \omega dt = \int F_B R_B \omega dt = \mu L R_B \int p \omega dt$, where $\mu$ is the friction coefficient between the stator and the rotor, $R_B$ is a radius corresponding to the distance from the center of rotation of the rotor to the point of application of the braking force, w is the angular velocity of the rotor, $F_B$ is the braking force, $M_B$ is the braking moment and p is the pressure between the stator and the rotor.

By combining 1 and 2, it is possible to calculate the friction coefficient from the following equation:

$$\mu = \frac{k \int T dt}{R_B \int p \omega dt} \quad 3)$$

Alternatively, the brake factor $B_F$ can be calculated according to the following equation.

$$B_F = R_B \mu = \frac{k \int T dt}{\int p \omega dt} \quad 4)$$

Once the brake factor or the friction coefficient is determined, the contact force of the stator can be controlled so that the desired braking moment is obtained for each individual brake of the vehicle. The control can be set up to ensure that the brakes at each axle absorb the load which is borne by that axle. The control can further be set up to ensure that the brakes at different axles absorb the same braking force, should such a braking strategy be desirable. In particular, the information can be used to control braking force distribution between the tow car and the trailer in such a way that the brakes of the trailer absorb the trailer load and the brakes of the tow car absorb the tow car load.

The integrals in the above formulae can be approximated in any way known to the person skilled in the art, for example by the summation or filtration of signals representing incorporated variables.

BRIEF DESCRIPTION OF THE DRAWINGS

The invention will be described in greater detail below with reference to the accompanying figures in which.

DETAILED DESCRIPTION

Figure 1:
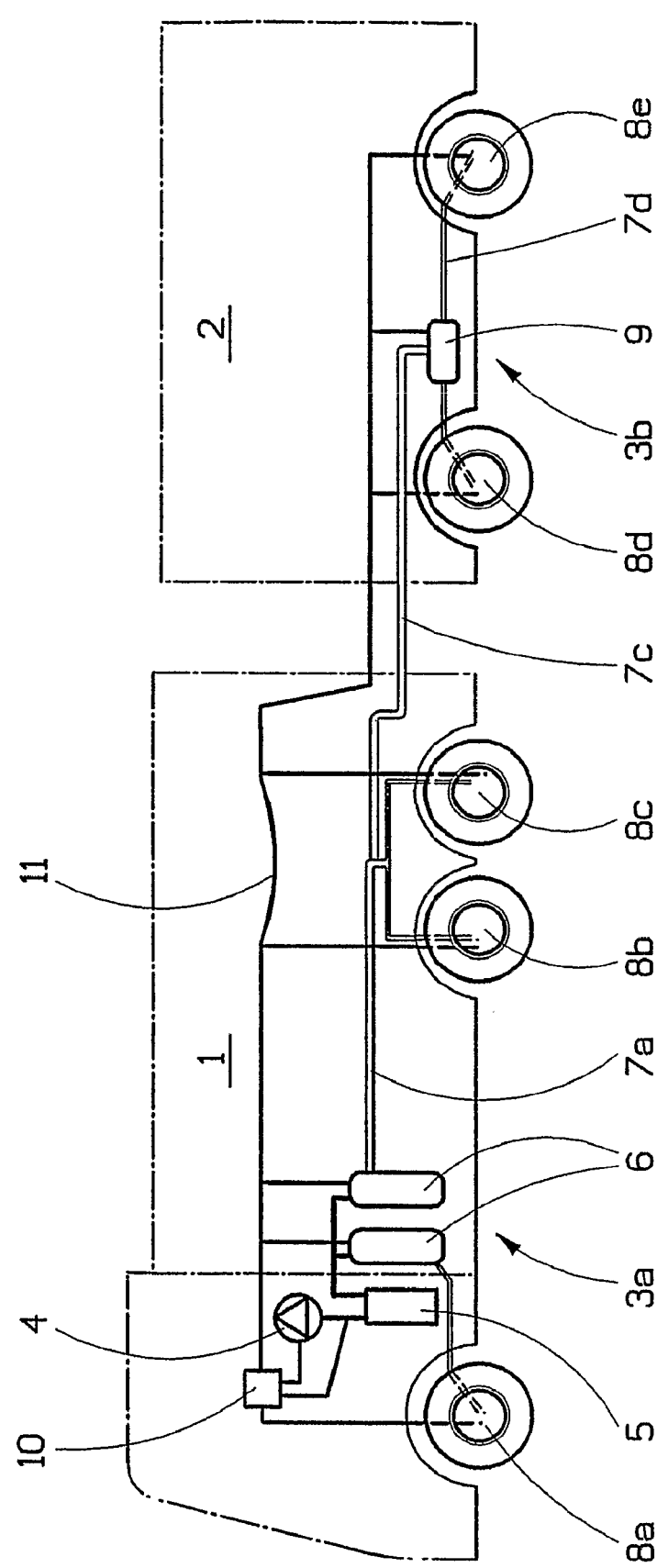
FIG. 1 diagrammatically shows a towing vehicle coupled to a trailer.

FIG. 1 shows a diagrammatic representation of a towing vehicle 1 coupled to a trailer 2. The towing vehicle 1 is equipped with a conventional-type braking system 3a. The trailer 2 is also equipped with a conventional type braking system 3b. The braking system 3a of the towing vehicle 1 is preferably a compressed-air-based braking system and comprises a compressor 4, which, via an air dryer 5, supplies one or more compressed-air tanks 6. The compressed-air tanks 6 supply a set of braking devices 8. The braking system 3a is connected by compressed-air lines 7a. The braking system 3b of the trailer 2, too, is preferably a compressed-air-based braking system. The braking system 3b of the trailer is preferably supplied by the compressor 4 of the tow car. To this end, the braking system 3b of the trailer is connected to the braking system 3a of the tow car by a compressed-air line 7c. The braking system 3b of the trailer comprises one or more compressed-air tanks 6, which supply the brakes 8d, 8e of the trailer via compressed-air lines 7d.

The braking system 3a of the tow car is preferably controlled by an electronic control unit 10. The control unit is set up to control and monitor the integral components of the braking system of the tow car, such as switching on and off the compressor 4, switching on and off the air dryer 5, pressure monitoring in the excess pressure air tanks 6 and application of the brakes 8. The braking system can also be controlled wholly mechanically, the compressor being switched on and off in dependence on a mechanical pressure governor disposed in the compressed-air tanks, the compressed-air dryer being switched on by mechanical means and the brakes being applied without electronic control. The braking system can also be configured as a combination of the above systems, in which certain functions are controlled electronically and others wholly mechanically. In this case, however, the control unit 10 is used to monitor the friction coefficient of braking devices 8 integral to the braking system, as will be described in greater detail below. The control unit 10 can also be arranged to control the braking system 3b of the trailer.

The control unit 10 can be arranged to communicate with separately arranged processors disposed in a communication system integral to the vehicle 1 and, where appropriate, to the trailer 2, which can be based, for example, on a CAN bus.

The control unit 10 comprises means 11 for establishing the friction coefficient $\mu$ of the braking devices 8a-8c of the tow car. The friction coefficient of the braking devices 8d, 8e of the trailer can also, of course, be established if the brakes of the trailer are monitored in the same way as the brakes of the tow car. Instead of the friction coefficient μ, the brake factor $R_B$ of the brake can be determined. The relationship between the friction coefficient and the brake factor has been explained above.

Figure 2:
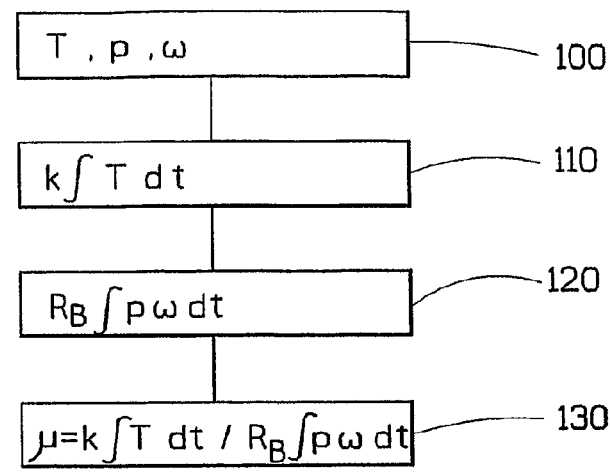
FIG. 2 is a flow chart for calculating the friction coefficient of a braking device.

The control unit 10 establishes the friction coefficient μ according to a method whose flow chart is described in FIG. 2. In a first method step 100, the temperature T of the respective braking device 8 is measured. The temperature T can be measured by a temperature probe fitted on or adjacent to the stator or rotor of the braking device or a part of the braking device which is in conductive contact with the stator or rotor. The temperature T can additionally be estimated by a temperature probe which measures the temperature of a control volume in the vicinity of the stator or rotor, in which the control volume shall be arranged such that thermal energy cannot dissipate uncontrolledly from the control volume, for example by the control volume being exposed to an air flow. In addition, the bearing pressure p between the stator and the rotor is measured or estimated. One example of how the bearing pressure can be estimated by a model-based calculation is given in U.S. Pat. No. 6,508,522. The bearing pressure can additionally be calculated, of course, through knowledge of applied air pressure to the brake cylinders.

In order to establish absorbed braking energy, the bearing pressure p and the angular velocity ω of the rotor shall also be estimated or measured. The bearing pressure can be estimated through knowledge of applied compressed air to brake pistons disposed in the braking device. The bearing pressure can also be estimated or measured in other ways well known to the person skilled in the art, for example by pressure or force transducers disposed alongside the braking device. The rotation speed of the rotor can be estimated or measured by a transducer, a so-called wheel speed transducer, which is arranged to measure the rotation speed, for example in the form of an inductive transducer. In addition, the rotation speed can also be approximated from the speed transducer of the vehicle.

In a second method step 110, a measure of thermal energy generated by the rotor and the stator during a time interval is calculated. This measure is calculated by estimating the following integral:

$$E = k\int T dt,$$

where k is a constant and T is constituted by the measured temperature. The integration is realized during the measuring time interval. The constant k is determined empirically and a specific value of k is stored in a memory area 12 of the means 11 for establishing the friction coefficient. The integral is estimated or calculated in a manner which is known to the person skilled in the art, for example by approximation of a sum.

In a third method step 120, a measure of braking energy absorbed by the rotor and the stator during the same time interval is established. The measure of the absorbed braking energy is estimated from an approximation of the following integral:

$$R_B \int p\omega dt,$$

where $R_B$ is a radius corresponding to the distance from the center of rotation of the rotor to the point of application of the braking force, ω is the angular velocity of the rotor, $F_B$ is the braking force, $M_B$ is the braking moment and p is the pressure between the stator and the rotor. The coefficient $R_B$ is stored in a memory area 13 of the means 11 for estimating the friction coefficient. An estimate of the value of the pressure between the stator and the rotor can be given by a pressure transducer and an estimate of the angular velocity can be given by a rotation speed transducer.

In a fourth method step 130, the friction coefficient is estimated by calculating the relationship between the above-stated measures, i.e. by estimating the relationship:

$$\mu = \frac{k\int T dt}{R_B \int p\omega dt}$$

Instead of estimating the friction coefficient, the brake factor BF of the vehicle can be calculated by estimating the relationship $$B_F = R_B \mu = \frac{k\int T dt}{\int p\omega dt}$$

The brake factor is directly proportional to the friction coefficient.

Figure 3:
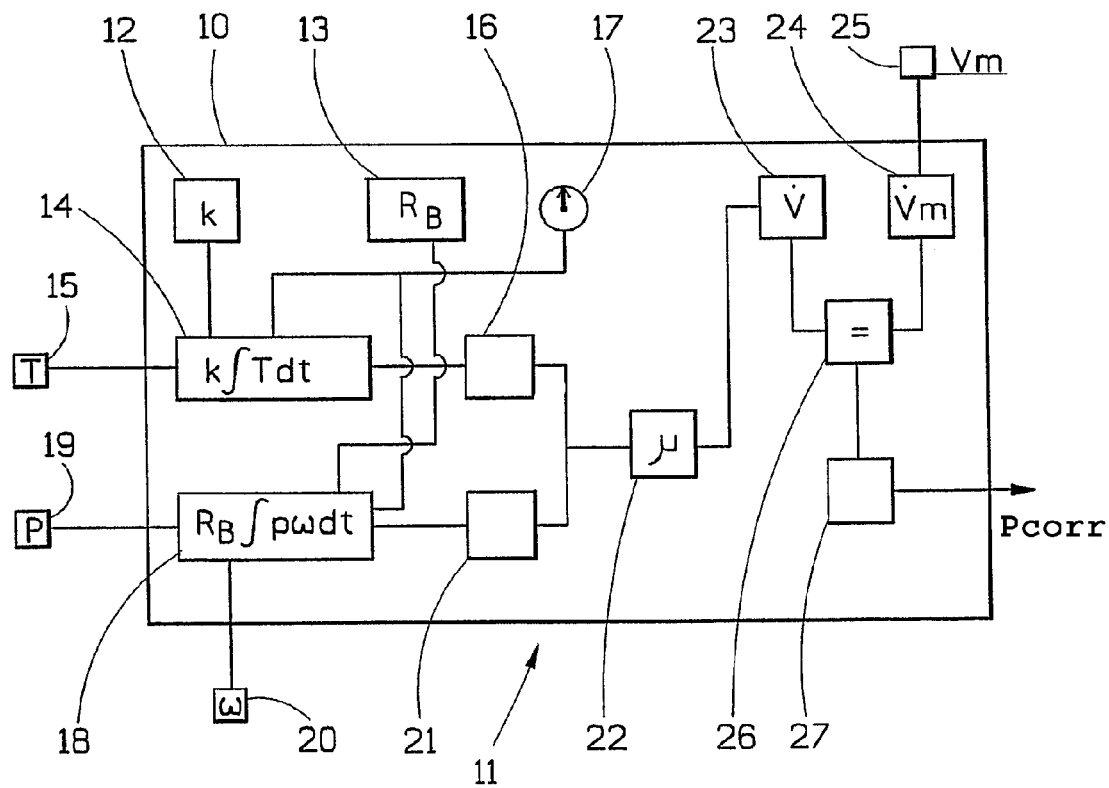
FIG. 3 shows a device for calculating the friction coefficient of a braking device.

In FIG. 3 the control unit 10 is shown, which comprises means 11 for establishing a measure of the friction coefficient between the stator and the rotor. As stated above, the means for establishing a measure of the friction coefficient comprise memory areas 12, 13, in which values of the constant k and the radius $R_B$ are stored.

The constant k constitutes input data to a first function block 14, in which a value of the integral $k\int T dt$ is estimated. The temperature T of the braking device, which constitutes input data to the first function block 14, is measured by a temperature sensor 15. The estimated value of the integral is fed out to a memory area 16. The integral is calculated and updated with sampling frequencies which are given by a clock function 17 integrated in the control unit.

The radius $R_B$ constitutes input data to a second function block 14, in which a value of the integral $R_B \int p\omega dt$ is estimated. The bearing pressure p and the angular velocity ω of the rotor constitute input data to the second function block 18. The pressure p is estimated by the use of a pressure transducer 19 and the angular velocity by the use of a rotation speed transducer 20. The estimated value of the integral is fed out to a memory area 21. The value of the integral is calculated and updated with sampling frequencies which are given by a clock function 17 integrated in the control unit. The value of the integral is approximated with the aid of numerical methods which are known per se, for example by summation of finite part-sums. The time interval within which the summation/integration is realized preferably lasts for a greater part of the braking.

In a third function block 22, a measure of the friction coefficient is established by forming the relationship between the value of the integral $k\int T dt$ stored in the memory area 16 and the value of the integral $R_B \int p\omega dt$ stored in the memory area 21.

In a fourth function block 23, said measure of the friction coefficient is used to establish a measure V of the retardation of the braking device or the vehicle, which measure is calculated from the friction coefficient. In this calculation, information is used concerning the axle load which each brake device would absorb if the trailer were to brake its own weight.

In a fifth function block 24, a measure $V_m$ of the retardation of the braking device or the vehicle is established by measurement via a sensor 25, which directly estimates the retardation through calculation from a speed signal, for example derivation of the speed obtained from rotation speed transducers provided for this purpose, for example in the form of wheel speed transducers.

A comparison between measured and calculated retardation in the fourth and the fifth function block 23, 24 is made in a sixth function block 26. Should there be a difference between measured and estimated retardation, a correction factor $P_{corr}$ for the bearing pressure to be applied to the brakes of the trailer is calculated in a seventh function block 27.

Figure 4:
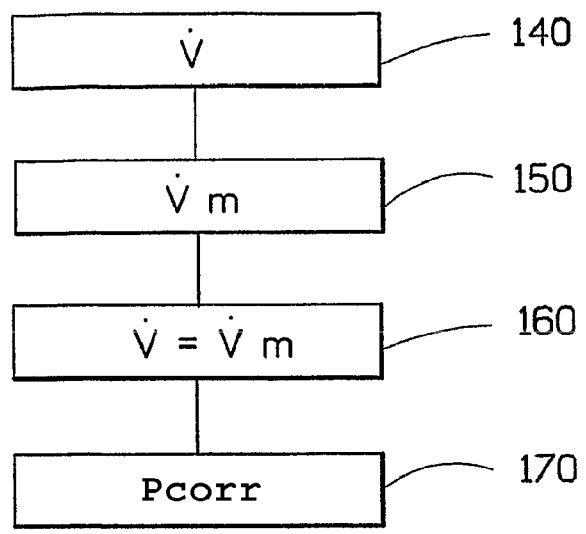
FIG. 4 shows a flow chart for a method for trailer compensation.

FIG. 4 shows a diagrammatic representation of a flow chart for a trailer adjustment method. In a first method step 140, a measure v of the retardation of the braking device or the vehicle is established via the calculated measure of the friction coefficient. In a second method step 150, a measure $V_m$ of the retardation of the braking device or the vehicle is established by measurement via a sensor 25, which directly estimates the retardation. In a third method step 160, a difference between the measured measure $V_m$ and the measure V of the retardation, calculated from the friction coefficient, is calculated. In a fourth method step 170, a correction factor $P_{corr}$ for the bearing pressure to be applied to the brakes of the trailer is calculated.

In greater detail, trailer adjustment is realized as follows: By measuring the axle loads of the vehicle in a known manner, such as, for example, with pressure transducers in the air bellows of the pneumatic suspension, it is possible to obtain the mass of the vehicle. With knowledge of the friction coefficient for each wheel and measured value of the application force of the stator, or, alternatively, the pressure in the brake cylinder, the braking force for each wheel can be calculated. With knowledge of the mass of the vehicle and the braking force of the vehicle, the expected retardation of the vehicle is calculated by dividing the braking force by the mass of the vehicle. Actual retardation is then calculated on the basis of a received measurement signal from the wheel speed transducers, whereupon the calculated retardation is compared with the expected retardation. If the actual retardation differs from the expected retardation, this is deemed to be due to the trailer, in which case the pressure to the trailer is adjusted so that actual and expected retardation coincide. If the actual retardation of the vehicle is less than the expected retardation, this is due to the fact that the brakes of the trailer do not fully brake the mass lying on the axles of the trailer. If the actual retardation of the vehicle is greater than the expected retardation, this is due to the fact that the brakes of the trailer produce too high a brake power.

Figure 5:
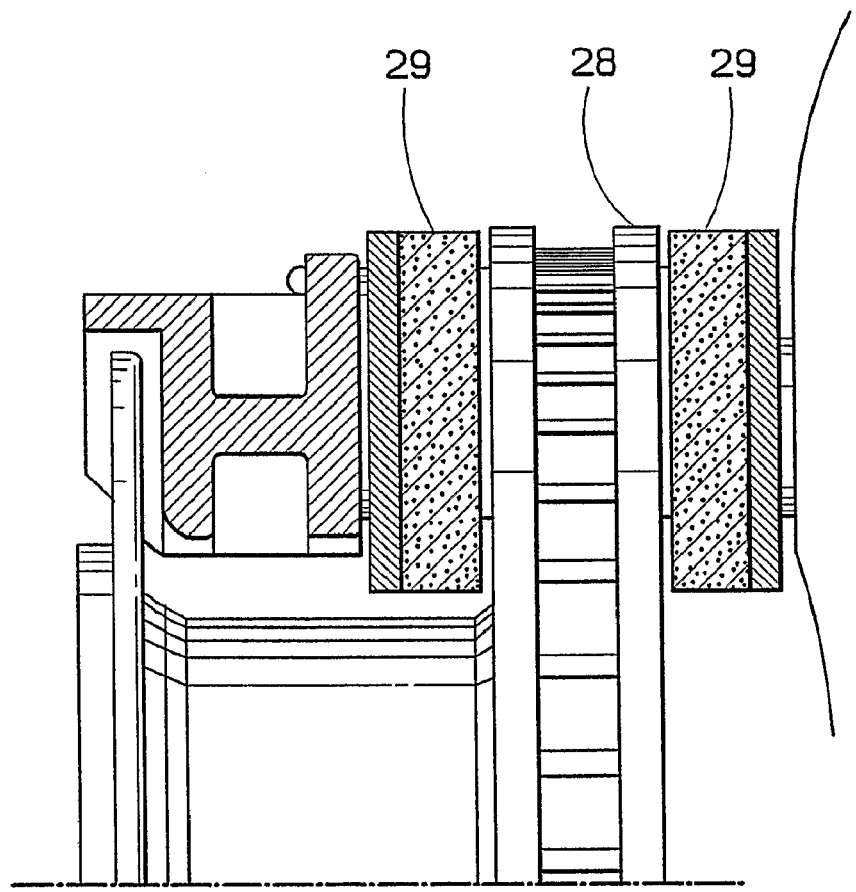
FIG. 5 shows diagrammatically a braking device comprising a rotor and a stator.

A braking device comprising a rotor, in the form of a disk 28, and a stator 29, which is pneumatically activated, is shown diagrammatically in FIG. 5 The invention can be used, for example, in braking devices of the kind shown in documents EP 621829, U.S. Pat. Nos. 5,622,240 and 5,515,949, the disclosures of which are expressly incorporated in their entireties in this description.

The invention can also, of course, be used with drum brakes and brakes of the kind which are not pneumatically activated.

What is claimed is:

1. A method for estimating a measure of the friction coefficient ($\mu$) between the stator (29) and the rotor (28) in a braking device (8) of a vehicle, said method comprising:
measuring (100) the temperature (T) of the braking device;
calculating (130) a friction coefficient ($\mu$) from the relationship between a measure of thermal energy (110) generated by the rotor and the stator during a time interval and a measure of braking energy (120) absorbed by the rotor and the stator during the same time interval, said generated thermal energy (110) being calculated as a function of said measured temperature (T); and
calculating a braking moment for at least one wheel of a vehicle using said friction coefficient ($\mu$).

2. The method as recited in claim 1, wherein the braking energy is calculated using a function dependent on the rotation speed and a pressure estimated between the stator and the rotor.

3. The method as recited in claim 1, further comprising estimating the angular velocity ($\omega$) of the rotor (28).

4. The method as recited in claim 3, wherein said measure of braking energy (120) absorbed by the rotor (28) and the stator (29) is constituted by an approximation of the following integral: $R_B \int p\omega dt$, where $R_B$ is constituted by the radius corresponding to the distance from the center of rotation of the rotor to the point of application of the braking force, p is constituted by the bearing pressure between the rotor and the stator, and $\omega$ is constituted by the angular velocity of the rotor.

5. The method as recited in claim 1, wherein said measure (110) of thermal energy generated by the rotor (28) and the stator (29) is constituted by an approximation of the following integral: $k \int T dt$, where k is a constant and T is constituted by the measured temperature.

6. The method as recited in claim 1, further comprising calculating a brake factor ($B_F$) of the braking device, wherein said brake factor ($B_F$) is proportional to said friction coefficient ($\mu$) multiplied by a radius ($R_B$) corresponding to the distance from the center of rotation of the rotor (28) to the point of application of the braking force.

7. The method as recited in claim 1, further comprising calculating a brake factor ($B_F$) of the braking device based upon a relationship between a measure (110) of thermal energy generated by the rotor and the stator during a time interval and a measure (120) of braking energy absorbed by the rotor and the stator during the same time interval in which said generated thermal energy is calculated from a function of said measured temperature.

8. The method as recited in claim 6, further comprising calculating a braking moment for each wheel or pair of wheels of a vehicle using said brake factor ($B_F$).

9. The method as recited in claim 7, further comprising calculating a braking moment for each wheel or pair of wheels of a vehicle using said brake factor ($B_F$).

10. The method as claimed in claim 8, further comprising calculating a difference between said calculated braking moment and a measured braking moment.

11. The method as claimed in claim 9, further comprising calculating a difference between said calculated braking moment and a measured braking moment.

12. The method as recited in claim 1, further comprising calculating a difference between said calculated braking moment and a measured braking moment.

13. The method as recited in claim 12, further comprising adjusting control of the braking force of braking devices integral to a trailer coupled to said vehicle using said measure of the difference between said calculated braking moment and a measured braking moment.

14. An arrangement for estimating a measure of the friction coefficient between the stator (29) and the rotor (28) in a braking device (8) of a vehicle comprising:
a temperature sensor (15) for measuring the temperature (T) of the braking device (8);
means (11) for establishing the friction coefficient ($\mu$) from a calculation (130) of the relationship between a measure (110) of thermal energy generated by the rotor and the stator during a time interval and a measure (120) of braking energy absorbed by the rotor and the stator during the same time interval, wherein said establishing means calculates the generated thermal energy as a function of said measured temperature (T); and means for calculating the difference between a calculated measure (23) of the retardation of the vehicle, calculated from said calculated friction coefficient, and a measured measure (24,25) of said retardation.

15. A control unit for estimating a measure of the friction coefficient ($\mu$) between the stator (29) and the rotor (28) in a braking device (8) of a vehicle comprising a temperature sensor (15) for measuring the temperature (T) of the braking device (8) and a machine executable code residing on the control unit for calculating a friction coefficient therefrom by executing the method set forth in claim 1.

16. An arrangement for estimating a measure of the friction coefficient between the stator (29) and the rotor (28) in a braking device (8) of a vehicle, said arrangement comprising:

a temperature sensor (15) that measures the temperature (T) of a braking device (8) of a vehicle; and a computer processor (11) programmed with a control program that determines a friction coefficient ($\mu$) from a calculation (130) of a relationship between a measure (110) of thermal energy generated by the rotor and the stator of the braking device (8) during a time interval and a measure (120) of braking energy absorbed by the rotor and the stator during the same time interval, wherein the control program calculates the generated thermal energy as a function of said measured temperature (T) and the control program further calculates the difference between a calculated measure (23) of the retardation of the vehicle, calculated from said calculated friction coefficient, and a measured measure (24,25) of said retardation.

17. The arrangement as recited in claim 16, wherein said control program further calculates a correction factor ($P_{corr}$) for the bearing pressure of the brakes in a trailer (3) coupled to a vehicle (2) whose brakes are monitored by the arrangement.

\* \* \* \* \*